(12) United States Patent
Lee et al.

(10) Patent No.: US 11,425,619 B2
(45) Date of Patent: Aug. 23, 2022

(54) ELECTRONIC DEVICE FOR PROVIDING COMMUNICATION SERVICE AND METHOD THEREOF

(71) Applicant: Samsung Electronics Co., Ltd., Suwon-si (KR)

(72) Inventors: Jinmo Lee, Suwon-si (KR); Keonyoung Lee, Suwon-si (KR); Daejun Kang, Suwon-si (KR); Dongsuk Jung, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 17/079,878

(22) Filed: Oct. 26, 2020

(65) Prior Publication Data

US 2021/0127310 A1    Apr. 29, 2021

(30) Foreign Application Priority Data

Oct. 25, 2019    (KR) .......................... 10-2019-0134061

(51) Int. Cl.
| | | |
|---|---|---|
| *H04W 4/00* | (2018.01) | |
| *H04W 36/08* | (2009.01) | |
| *H04W 36/30* | (2009.01) | |

(52) U.S. Cl.
CPC ........... *H04W 36/08* (2013.01); *H04W 36/30* (2013.01)

(58) Field of Classification Search
CPC ..... H04W 36/08; H04W 36/30; H04W 60/00; H04W 48/20; H04W 36/305; H04W 36/0079; H04W 36/32; H04W 36/36

USPC ......................................................... 370/331
See application file for complete search history.

(56) References Cited

U.S. PATENT DOCUMENTS

| 8,838,089 | B2 * | 9/2014 | Wu ....................... H04W 76/18 370/335 |
|---|---|---|---|
| 9,820,254 | B2 * | 11/2017 | Mochizuki ............ H04W 60/04 |
| 10,314,099 | B2 * | 6/2019 | Koshta ................ H04W 60/005 |
| 10,623,268 | B2 * | 4/2020 | Altay ...................... H04L 41/12 |
| 2016/0212782 | A1 | 7/2016 | Ko et al. |
| 2016/0381613 | A1 * | 12/2016 | Duan .................... H04W 36/24 370/331 |
| 2019/0035426 | A1 | 1/2019 | Wilson et al. |
| 2019/0116483 | A1 * | 4/2019 | Ryu ...................... H04W 68/02 |

* cited by examiner

*Primary Examiner* — Amancio Gonzalez
(74) *Attorney, Agent, or Firm* — Jefferson IP Law, LLP

(57) ABSTRACT

An electronic device for providing a communication service, and an operating method thereof is provided. Herein, the electronic device may include a communication circuitry, at least one processor, and a memory operatively coupled with the at least one processor to store a Tracking Area Identifier (TAI) list. The memory may include instructions, when executed, causing the at least one processor to run a specified first timer upon detecting an attach failure or a Tracking Area Update (TAU) failure in a first cell, perform cell reselection on a second cell during the first timer runs, determine whether a TAI of the second cell is included in the TAI list, and when the TAI of the second cell is included in the TAI list, forcibly expire the first timer, and transmit an attach request message or a TAU message through the communication circuitry.

20 Claims, 6 Drawing Sheets

ELECTRONIC DEVICE FOR PROVIDING COMMUNICATION SERVICE AND METHOD THEREOF

CROSS-REFERENCE TO RELATED APPLICATION(S)

This application is based on and claims priority under 35 U.S.C. § 119(a) of a Korean patent application number 10-2019-0134061, filed on Oct. 25, 2019, in the Korean Intellectual Property Office, the disclosure of which is incorporated by reference herein in its entirety.

BACKGROUND

1. Field

The disclosure relates to a method and apparatus for providing a communication service in an electronic device.

2. Description of Related Art

In a network supporting a Long Term Evolution (LTE) system, an electronic device (e.g., a User Equipment (UE)) communicates with a base station coupled to a telecommunications network through radio links. In the LTE network, when the electronic device is in an active state in which communication is performed, a location of the electronic device may be identified or managed on a base station and/or a cell basis. In the LTE network, when the electronic device is in an idle state in which communication is not performed, the location of the electronic device may be identified and managed on a tracking area basis. For example, in the LTE system, upon generating traffic for the electronic device in the idle state, a tracking area in which the electronic device is located may be identified, and a paging signal may be transmitted to the electronic device through base stations in the identified tracking area.

The above information is presented as background information only to assist with an understanding of the disclosure. No determination has been made, and no assertion is made, as to whether any of the above might be applicable as prior art with regard to the disclosure.

SUMMARY

An electronic device may perform an attach procedure or a Tracking Area Update (TAU) procedure with respect to a network node (e.g., an MME and/or a PDN GW) through a base station. When an attach or TAU failure occurs, the electronic device may run a T3411 timer. The T3411 timer may run to measure a period for reattempting the attach or the TAU. In this case, since the electronic device is in an idle state in which communication is not performed, cell reselection may be performed on a cell having better channel quality. However, when a tracking area of the reselected cell is included in a stored tracking area list, the electronic device may attempt the attach or the TAU for the network during the T3411 timer runs. The electronic device may use a communication service including a call, text, and data until the T3411 timer expires.

Aspects of the disclosure are to address at least the above-mentioned problems and/or disadvantages and to provide at least the advantages described below. Accordingly, an aspect of the disclosure is to provide an apparatus and method for minimizing a delay of a communication service in an electronic device.

Additional aspects will be set forth in part in the description which follows and, in part, will be apparent from the description, or may be learned by practice of the presented embodiments.

Technical problems to be achieved in the disclosure are not limited to the technical problems mentioned above, and other technical problems not mentioned herein can be clearly understood by those skilled in the art to which the disclosure pertains from the following descriptions.

In accordance with an aspect of the disclosure, an electronic device is provided. The electronic device includes a communication circuitry, at least one processor, and a memory operatively coupled with the at least one processor to store a tracking area identifier (TAI) list. The memory may include instructions, when executed, causing the at least one processor to run a specified first timer upon detecting an attach failure or a tracking area update (TAU) failure in a first cell, perform cell reselection on a second cell during the first timer runs, determine whether a TAI of the second cell is included in the TAI list, and when the TAI of the second cell is included in the TAI list, forcibly expire the first timer, and transmit an attach request message or a TAU message through the communication circuitry.

In accordance with another aspect of the disclosure, a method of operating an electronic device is provided. The method includes running a specified first timer upon detecting an attach failure or a TAU failure in a first cell, performing cell reselection on a second cell during the first timer runs, determining whether a TAI of the second cell is found in the TAI list, and when the TAI of the second cell is found in the TAI list, forcibly expiring the first timer, and transmitting an attach request message or a TAU message through a communication circuitry.

In accordance with another aspect of the disclosure, an electronic device forcibly expires a running timer when communication is not smoothly achieved, and transmits an attach request or tracking area update (TAU) request message, thereby decreasing a communication service delay time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
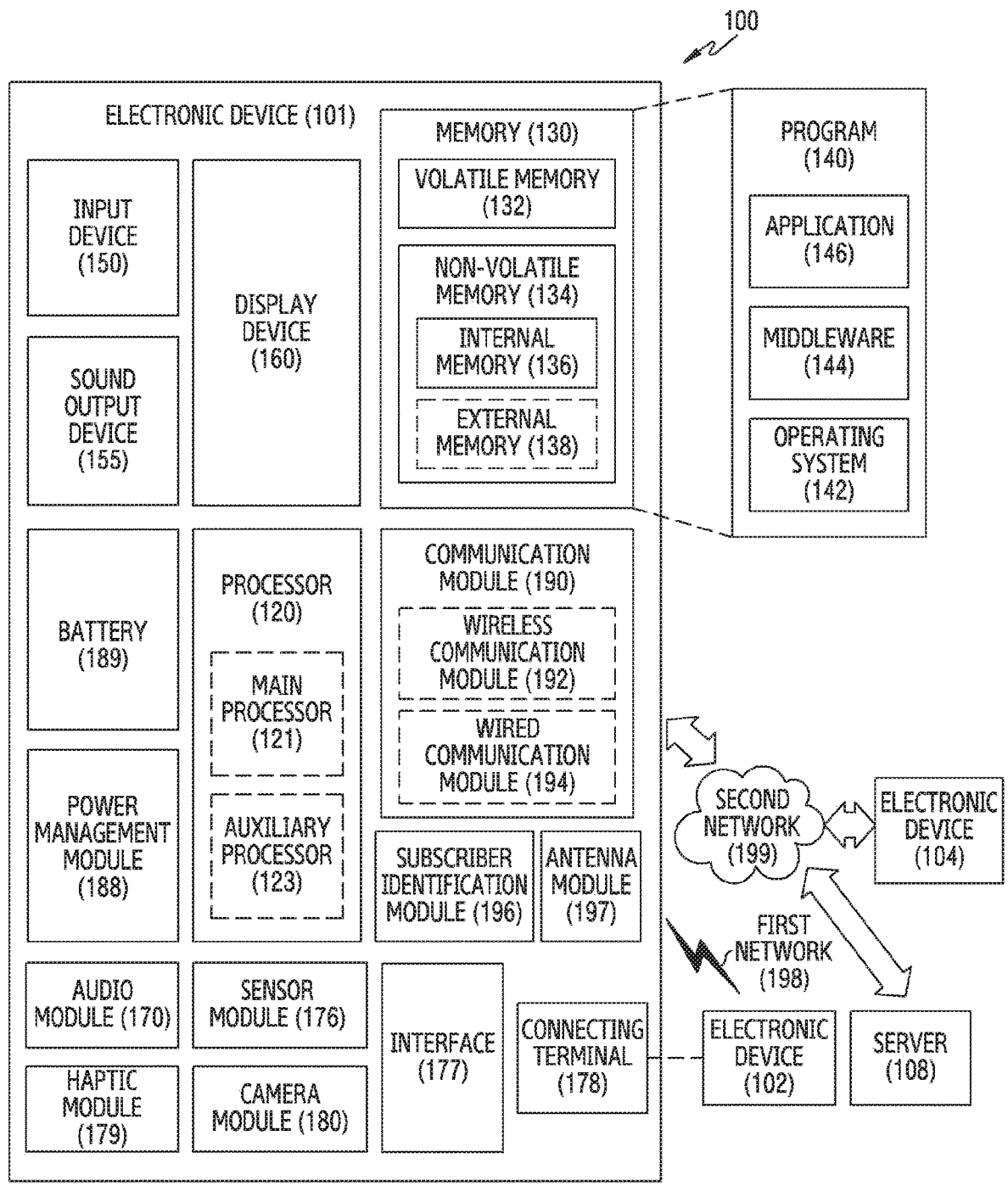
FIG. 1 is a block diagram of an electronic device in a network environment, according to an embodiment of the disclosure.

FIG. 1 illustrates an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, or an application 146.

The input device 150 may receive a command or data to be used by another component of the electronic device 101 (e.g., the processor 120), from the outside (e.g., a user) of the electronic device 101. The input device 150 may include a microphone, a mouse, a keyboard, and/or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an tamospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management IC (PMIC).

The battery 189 may supply power to at least one component of the electronic device 101. The battery 189 may include a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency IC (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device may be one of various types of electronic devices. An electronic device may include a portable communication device (e.g., a smartphone), a computer device, a portable multimedia device, a portable medical device, a camera, a wearable device, or a home appliance. However, the electronic devices are not limited to the examples described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific IC (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to various embodiments, the processor 120 may establish and manage a communication session between the electronic device 101 and a network, and may control a function for maintaining persistent communication based on a movement of the electronic device 101. According to an embodiment, the processor 120 may acquire a Tracking Area Identifier (TAI) list during an attach procedure or a Tracking Area Update (TAU) procedure. The TAI list may include an identifier of at least one tracking area managed by a corresponding Mobility Management Entity (MME). For example, when tracking areas managed by the MME are a first tracking area and a second tracking area, the TAI list may include an identifier of the first tracking area and an identifier of the second tracking area. The identifier of the tracking area may consist of a Public Land Mobile Network Identifier (PLMN ID) and/or a Tracking Area Code (TAC). For example, the processor 120 may transmit an attach request message for a network attach through the communication module 190, and may receive an attach accept message including the TAI list in response to the attach request message transmission. For another example, the processor 120 may transmit a TAU request message when there is a change in a tracking area in which the electronic device 101 is located or there is a change in a Radio Access Technology (RAT), and in response thereto, may receive a TAU accept message including the TAI list. According to an embodiment, the processor 120 may store the acquired TAI list in the memory 130.

According to various embodiments, the processor 120 may transmit the attach request message and/or the TAU request message, and may determine whether an attach failure and/or a TAU failure occurs. For example, when an attach is rejected or a TAU is rejected due to a weak electronic field situation or an unspecified cause, the processor 120 may recognize an occurrence of an attach failure caused by a low layer failure or a TAU failure caused by the low layer failure. For another example, when a response message for the attach request is not received within a specified first time duration from a timing at which the attach request message is transmitted, the processor 120 may determine that the attach has failed. The response message for the attach request may include at least one of an attach accept message and an attach reject message. The specified first time duration may be, for example, a time duration in which a T3410 timer runs. For another example, when the response message for the TAU request is not received within the specified second time duration from a timing at which the TAU request message is transmitted, the processor 120 may recognize that the TAU has failed. The response message for the TAU request may include at least one of a TAU accept message and a TAU reject message. The specified second time duration may be, for example, a time duration in which a T3430 timer runs.

According to various embodiments, upon the occurrence of the attach failure and/or the TAU failure, the processor 120 may run the specified first timer (e.g., T3411). The first timer may be a timer for measuring a waiting timer for retransmission of the attach request message or retransmission of the TAU request message. For example, when the first timer expires, the processor 120 may retransmit the attach request message or the TAU request message. According to an embodiment, the processor 120 may perform cell reselection during the first timer runs. For example, the processor 120 may perform cell reselection for moving from a first cell in which the attach or the TAU is attempted on a neighboring second cell. Herein, as defined in the standard specification, the cell reselection may include not only a cell reselection operation of the electronic device 101 in an idle state after a network attach but also an operation in which the electronic device 101 that has lost a connection of the network camps on another cell.

According to an embodiment, when channel quality of the second cell is better than channel quality of the first cell, the processor 120 may allow cell reselection to be performed on the second cell through the communication module 190. According to an embodiment, irrespective of the channel quality of the first cell and the channel quality of the second cell, the processor 120 may forcibly bar the use of the first cell and may allow cell reselection to be performed on the second cell through the communication module 190. For example, even if the channel quality of the first cell is better than the channel quality of the second cell, the processor 120 may control the communication module 190 to perform cell reselection on the second cell relatively more adjacent than the first cell. According to an embodiment, the use of the first call may be forcibly barred only during the first timer runs, and the barring on the first cell may be released when the first timer expires, thereby returning to the first cell on the basis of channel quality.

According to various embodiments, the processor 120 may determine whether a tracking area of the reselected second cell is included in the TAI list stored in the memory 130. For example, the processor 120 may compare a TAI of the reselected second cell and a TAI included in the TAI list stored in the memory 130 to determine whether the tracking area of the reselected second cell is included in the TAI list. According to an embodiment, if the tracking area of the reselected second cell is not included in the TAI list stored in the memory 130, the processor 120 may forcibly expire the first timer, and may transmit an attach request message or a TAU request message to a base station of the second cell. According to an embodiment, if the tracking area of the reselected second cell is included in the TAI list stored in the memory 130, the processor 120 may determine whether the first timer forcibly expires on the basis of the channel quality of the reselected second cell. For example, if received signal strength of the reselected second cell is greater than a threshold, the processor 120 may forcibly expire the first timer, and may transmit the attach request message or the TAU request message to the base station of the reselected second cell. For another example, if the received signal strength of the reselected second cell is less than or equal to the threshold, the processor 120 may wait until the first timer expires, and after the first timer expires, may transmit the attach request message or the TAU request message to the base station of the reselected second cell. According to an embodiment, if the tracking area of the reselected second cell is included in the TAI list stored in the memory 130, the processor 120 may forcibly expire the first timer irrespective of channel quality of the reselected second cell, and may retransmit the attach request message or the TAU request message. According to an embodiment, if the tracking area of the reselected second cell is not included in the TAI list stored in the memory 130, the processor 120 may transmit a service request message to the base station of the reselected second cell. For example, if the TAI of the reselected cell is included in the TAI list stored in the memory 130 in a situation where the first timer runs due to a TAU failure, the processor 120 may determine that there is no need to perform a TAU procedure. If it is determined that there is no need to perform the TAU procedure, the processor 120 may omit the operation of transmitting the TAU request message and may transmit the service request message.

An electronic device (e.g., the electronic device 101 shown in FIG. 1) according to an embodiment may include: a communication module (e.g., the communication module 190 shown in FIG. 1); at least one processor (e.g., the processor 120 shown in FIG. 1); and a memory (e.g., the memory 130 shown in FIG. 1) operatively coupled with the at least one processor to store a Tracking Area Identifier (TAI) list, wherein the memory comprises instructions, when executed, causing the at least one processor to: run a specified first timer upon detecting an attach failure or a Tracking Area Update (TAU) failure in a first cell; perform cell reselection on a second cell during the first timer runs; determine whether a TAI of the second cell is found in the TAI list; and if the TAI of the second cell is found in the TAI list, forcibly expire the first timer, and transmit an attach request message or a TAU message through the communication module.

According to an embodiment, the instructions cause the at least one processor to: if the TAI of the second cell is found in the TAI list, determine whether channel quality of the second cell satisfies a specified condition; and if the channel quality of the second cell satisfies the specified condition, expire the first timer, and transmit the attach request message or the TAU message through the communication module.

According to an embodiment, the instructions cause the at least one processor to: if the channel quality of the second cell does not satisfy the specified condition, wait until the first timer expires, and if the first timer expires, transmit the attach request message or the TAU message through the communication module.

According to an embodiment, the instructions cause the at least one processor to, if the TAI of the second cell is found in the TAI list, stop the first timer, and transmit a service request message through the communication module.

According to an embodiment, the instructions cause the at least one processor to bar the use of the first cell, and control the communication module to perform cell reselection on the second cell, during the first timer runs.

According to an embodiment, the instructions cause the at least one processor to: transmit an attach request message in the first cell, detect whether the attach failure occurs due to a low layer failure after the attach request message is transmitted, and run the first timer upon detecting the attach failure due to the low layer failure.

According to an embodiment, the instructions cause the at least one processor to: transmit an attach request message in the first cell, determine whether a response for the attach request message is received during a specified time duration from a timing at which the attach request message is transmitted, and if the response for the attach request message is not received during the specific time duration, detect the attach failure, and run the first timer.

According to an embodiment, the instructions cause the at least one processor to: transmit a TAU request message in the first cell, determine whether the TAU failure caused by the low layer failure is detected after the TAU request message is transmitted, and run the first timer upon detecting the TAU failure.

According to an embodiment, the instructions cause the at least one processor to: transmit a TAU request message in the first cell, determine whether the response for the TAU request message is received during a specified time duration from a timing at which the TAU request message is transmitted, and if the response for the TAU request message is not received during the specific time duration, detect the TAU failure, and run the first timer.

According to an embodiment, the TAI list is acquired through at least one of a previously received attach accept message and a TAU accept message.

Figure 2:
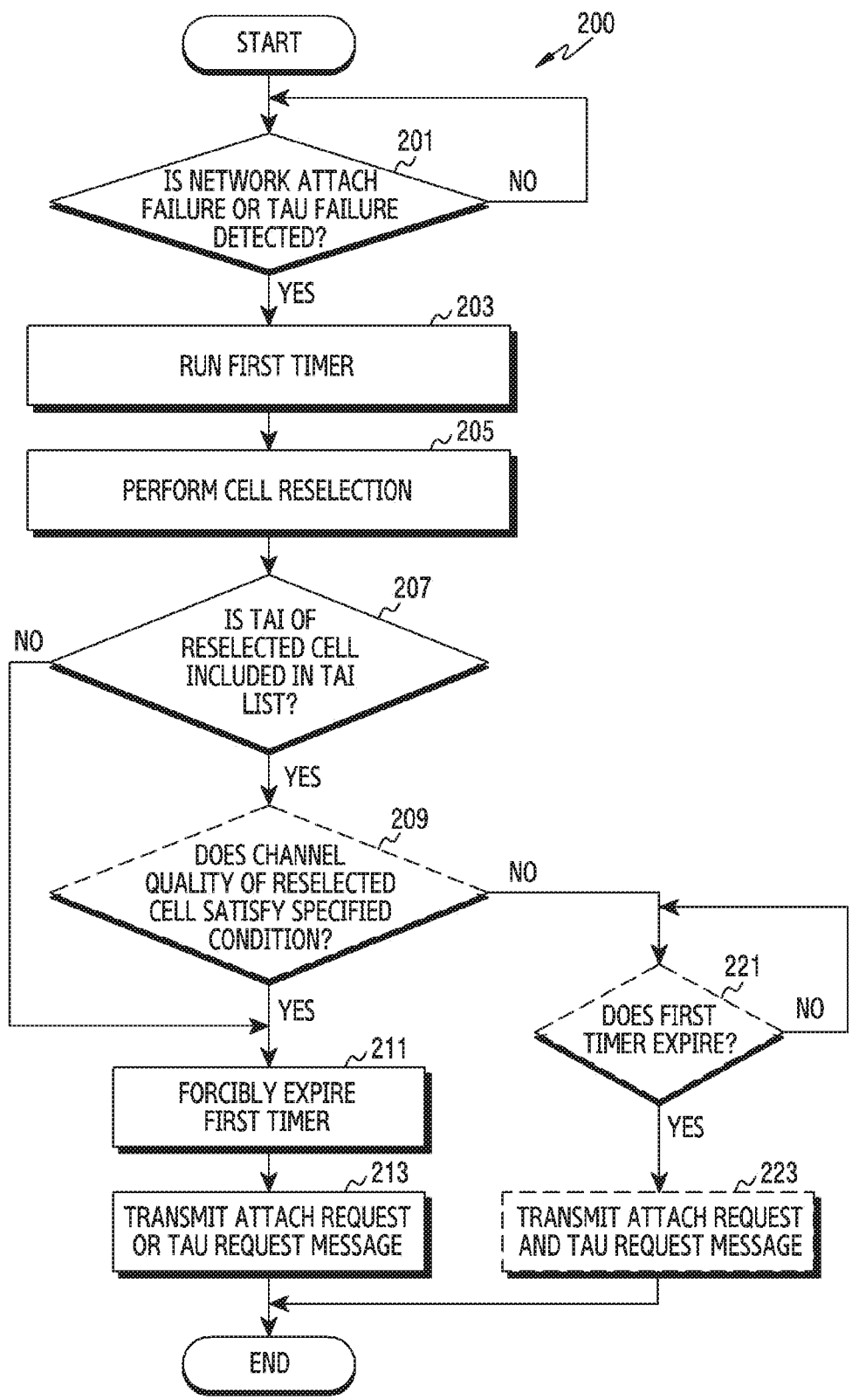
FIG. 2 is a flowchart of a wireless connection procedure performed in an electronic device, based on a tracking area of a reselected cell, according to an embodiment of the disclosure.

FIG. 2 is a flowchart of a wireless connection procedure performed in an electronic device, based on a tracking area of a reselected cell, according to an embodiment of the disclosure. The electronic device performing the operation of FIG. 2 may be the electronic device 101 of FIG. 1. Herein, an operation indicated by a dotted line may be omitted according to an embodiment.

Referring to FIG. 2, according to various embodiments, in a method 200, at operation 201, the electronic device (e.g., the processor 120 of FIG. 1) may determine whether a network attach failure or a TAU failure occurs.

According to an embodiment, after transmitting an attach request message, upon detecting an attach failure due to a weak electric field or an attach rejection due to an unspecified cause, the processor 120 may determine that an attach failure occurs due to a low layer failure.

According to an embodiment, after transmitting a TAU request message, upon detecting a TAU failure due to a weak electric field or a TAU rejection due to an unspecified cause, the processor 120 may determine that a TAU failure occurs due to a low layer failure.

According to an embodiment, the processor 120 may determine that an attach has failed if a response message (e.g., the attach accept message or the attach reject message) is not received for an attach request within a specified first time duration from a timing at which the attach request message is received. The specified first time duration may be, for example, a time duration in which a T3410 timer runs.

According to an embodiment, when the response message (e.g., the TAU accept message or the TAU reject message) for the TAU request is not received within the specified second time duration from a timing at which the TAU request message is transmitted, the processor 120 may determine that the TAU has failed. The specified second time duration may be, for example, a time duration in which a T3430 timer runs.

According to various embodiments, in operation 203, the electronic device (e.g., the processor 120) may run a specified first timer. The first timer may be a timer for determining a timing at which transmission of the attach request message or retransmission of the TAU request message is possible. The first timer may be, for example, a T3411 timer for measuring a third time duration. The first timer may run for a specified third time, and may expire when the third time is over. The processor 120 cannot transmit the attach request message or the TAU request message during the first timer runs, and can transmit the attach request message or the TAU request message after the first timer expires.

According to various embodiments, in operation 205, the electronic device (e.g., the processor 120 and/or the communication module 190 of FIG. 1) may perform cell reselection. According to an embodiment, the processor 120 may perform cell reselection during the specified first timer runs. For example, the processor 120 may perform cell reselection for moving from a first cell in which the attach request message or the TAU message is transmitted to a neighboring second cell.

According to an embodiment, the processor 120 may perform cell reselection on the basis of channel quality of each of the first cell and the neighboring second cell. For example, the processor 120 may compare channel quality information of the first cell in which the electronic device 101 is currently located and channel quality information of neighboring cells, and thus may control the communication module 190 to perform cell reselection on the neighboring second cell having better channel quality than the first cell among neighboring cells. The channel quality information may include at least one of Reference Signal Received Power (RSRP), Reference Signal Received Quality (RSRQ), Received Signal Strength Index (RSSI), and Signal to Interference Noise Ratio (SINR).

According to an embodiment, the processor 120 may control the communication module 190 such that the use of the first cell is forcibly barred during the specified first timer runs and cell reselection is performed on a neighboring second cell having the best channel quality among neighboring cells. According to an embodiment, when cell reselection is performed, the processor 120 may acquire information on the reselected cell. The information on the reselected cell may include at least one of a cell identifier and a TAI. The TAI may indicate a tracking area to which the reselected cell belongs.

According to various embodiments, in operation 207, the electronic device (e.g., the processor 120) may determine whether the TAI of the reselected cell is included in a pre-acquired TAI list. According to an embodiment, the processor 120 may acquire a pre-stored TAI list from a memory (e.g., the memory 130 of FIG. 1) and compare at least one TAI included in the acquired TAI list and the reselected TAI to determine whether the TAI of the reselected cell is included in the acquired TAI list.

According to various embodiments, if the TAI of the reselected cell is not included in the TAI list, the electronic device (e.g., the processor 120) may directly proceed to operation 211 described below.

According to various embodiments, if the TAI of the reselected cell is included in the pre-acquired TAI list, in operation 209, the electronic device (e.g., the processor 120) may determine whether channel quality of the reselected cell satisfies a specified condition. For example, the processor 120 may determine whether RSRP of the reselected cell is greater than or equal to a specified threshold (e.g., about 110 dBm). Herein, the threshold is a value for convenience of explanations, and is not limited to various embodiments of the disclosure. The processor 120 may determine whether the channel quality of the reselected cell satisfies the specified condition by using different information indicating a channel quality indicator such as RSRQ, RSS According to various embodiments, if the channel quality of the reselected cell satisfies the specified condition, in operation 211, the electronic device (e.g., the processor 120) may forcibly expire the first timer. For example, if the RSRP of the reselected cell is greater than or equal to the specified threshold, the processor 120 may forcibly expire the first timer which is running.

According to various embodiments, in operation 211, the electronic device (e.g., the processor 120 and/or the communication module 190) may transmit the attach request or the TAU request message. In response to the forced expiry of the first timer, the processor 120 may control the communication module 190 to transmit the attach request or the TAU request message through the reselected cell.

According to various embodiments, if the channel quality of the reselected cell does not satisfy the specified condition, in operation 221, the electronic device (e.g., the processor 120) may determine whether the first timer expires. For example, if the RSRP of the reselected cell is less than or equal to a specified threshold, the processor 120 may determine whether the running first timer expires.

According to various embodiments, if the first timer expires, in operation 223, the electronic device (e.g., the processor 120) may transmit the attach request or the TAU request message. For example, if the channel quality of the reselected cell does not satisfy the specified condition, the processor 120 may wait until the first timer expires, and if the first timer expires, may control the communication module 190 to transmit the attach request or the TAU request message.

A method in which the electronic device 101 forcibly expires the first timer in operations 211 and 213, and thereafter transmits the attach request or the TAU request message is described above with reference to FIG. 2. However, the electronic device 101 according to an embodiment may transmit a service request message instead of the attach request or TAU request message. For example, when the TAU failure is detected in operation 201 but it is identified in operation 207 that the TAI of the reselected cell is included in the pre-acquired TAI list, the electronic device 101 may determine that there is no need to perform the TAU procedure, and may provide control such that the service request message is transmitted instead of the TAU request message. For example, the electronic device 101 may transmit the service request message after stopping the first timer. Herein, the timer does not expire but stop because it is configured such that the attach request or TAU request message is transmitted when the first timer expires.

Figure 3:
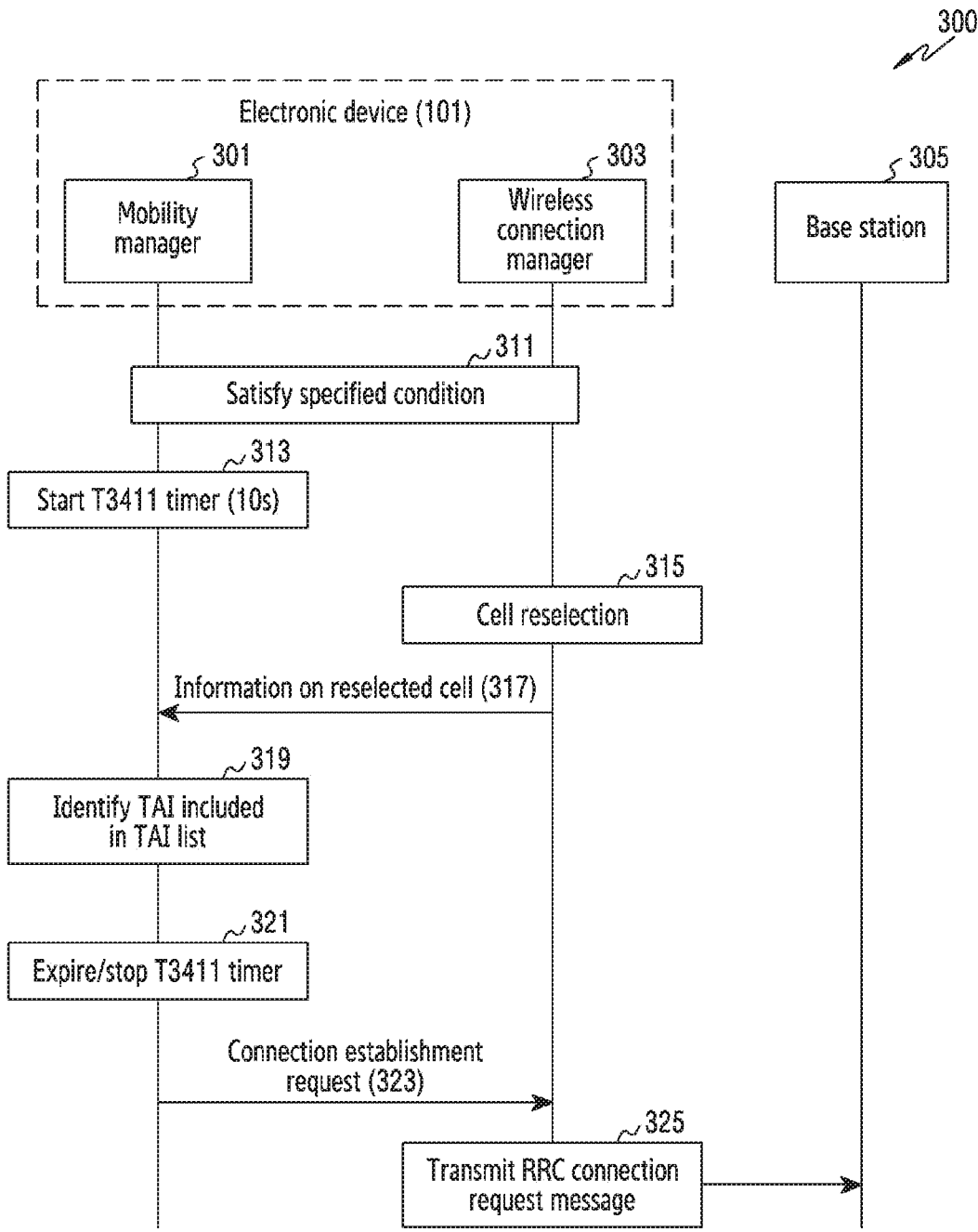
FIG. 3 illustrates a signal flow of a wireless connection procedure performed in an electronic device, based on a tracking area of a reselected cell, according to an embodiment of the disclosure.

FIG. 3 illustrates a signal flow of a wireless connection procedure performed in an electronic device, based on a tracking area of a reselected cell, according to an embodiment of the disclosure. At least some operations of FIG. 3 described below will be described with reference to FIG. 4.

Figure 4:
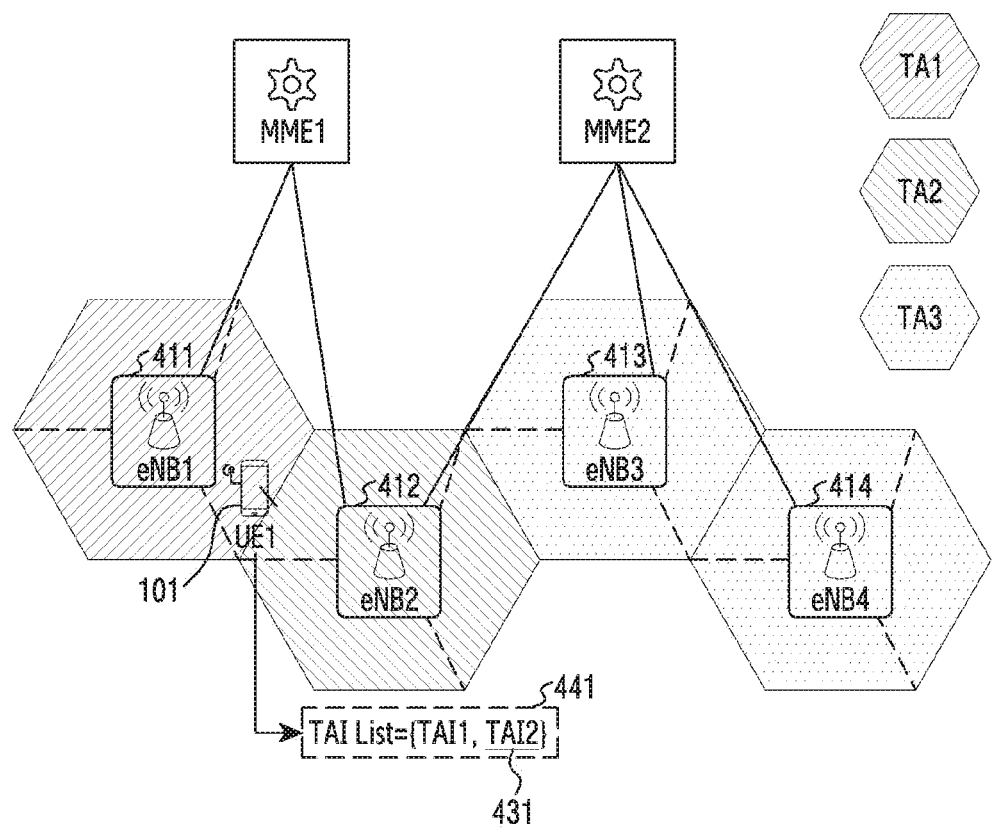
FIG. 4 is a view of a wireless connection procedure performed in an electronic device, based on a tracking area of a reselected cell, according to an embodiment of the disclosure.

FIG. 4 is a view of a wireless connection procedure performed in an electronic device, based on a tracking area of a reselected cell, according to an embodiment of the disclosure. The electronic device of FIG. 3 may be the electronic device 101 of FIG. 1.

Referring to FIG. 3, in a method 300, the electronic device 101 may include a mobility manager 301 and a wireless connection manager 303. The mobility manager 301 may be a Mobility Management (MM) sub-layer in a Non-Access Stratum (NAS) layer. The NAS layer may manage a communication session configuration between a core network and the electronic device 101, and may control a function for maintaining persistent communication according to a movement of the electronic device 101. The MM sub-layer may manage mobility of the electronic device 101. The wireless connection manager 303 may be a Radio Resource Control (RRC) sub-layer in an Access Stratum (AS) layer. The AS layer may manage a wireless connection between the electronic device 101 and a base station 305. The RRC sub-layer may generate and manage a control message for the wireless connection between the electronic device 101 and the base station 305.

Referring to FIG. 3, in operation 311, the mobility manager 301 and wireless connection manager 303 of the electronic device 101 according to various embodiments may detect that a specified condition is satisfied. The specified condition may include at least one of detection of an attach failure caused by a low layer failure, detection of a TAU failure caused by the low layer failure, and expiry of a T3410 timer or expiry of a T3411 timer.

According to various embodiments, in operation 313, the mobility manager 301 may start the running of the T3411 timer. The T3411 timer may be a first timer for measuring a waiting time for retransmission of an attach request message or retransmission of a TAU request message.

According to various embodiments, in operation 315, the wireless connection manager 303 may perform cell reselection. For example, the cell reselection operation may be identical to the operation 205 of FIG. 2. According to various embodiments, in operation 317, the wireless connection manager 303 may provide the mobility manager 301 with information related to the reselected cell. The information on the reselected cell may include at least one of a cell identifier and a TAI. According to an embodiment, the TAI may include a PLMN, an ID, and a TAC.

According to various embodiments, in operation 319, the mobility manager 301 may detect that the TAI of the reselected cell, received from the wireless connection manager 303, is included in the TAI list. According to various embodiments, if the TAI of the reselected cell is included in the TAI list, the mobility manager 301 may expire or stop the T3411 timer in operation 321, and may transmit a wireless connection establishment request message to the wireless connection manager 303 in operation 323. The wireless connection establishment request message may be an attach request message, a TAU request message, or a message for requesting transmission of a service request message.

According to various embodiments, in operation 325, the wireless connection manager 303 may transmit a request message for an RRC connection to the base station 305 of a reselected cell, in response to receiving of the wireless connection establishment request message from the mobility manager 301. The request message for the RRC connection may include at least one of an attach request message, a TAU request message, and a service connection request message. By transmitting the request message for the RRC connection, the electronic device 101 may establish an RRC connection with the base station 305 to provide a communication service.

Referring to FIG. 4, if the electronic device 101 (a user equipment 1) pre-acquires a TAI list 441 including a TAI1 and a TAI2 and if a TAI of the reselected second cell is the TAI2, since the TAI2 which is the TAI of the second cell is identical to the TAI2 431 included in the pre-acquired TAI list 441, the electronic device 101 may expire or stop a T3411 timer, and thereafter may transmit an attach request message, a TAU request message, or a service request message to the base station (i.e., eNB2) of the reselected second cell. In addition to the electronic device 101, the system also includes eNBs 411, 412, 413 and 414.

Figure 5:
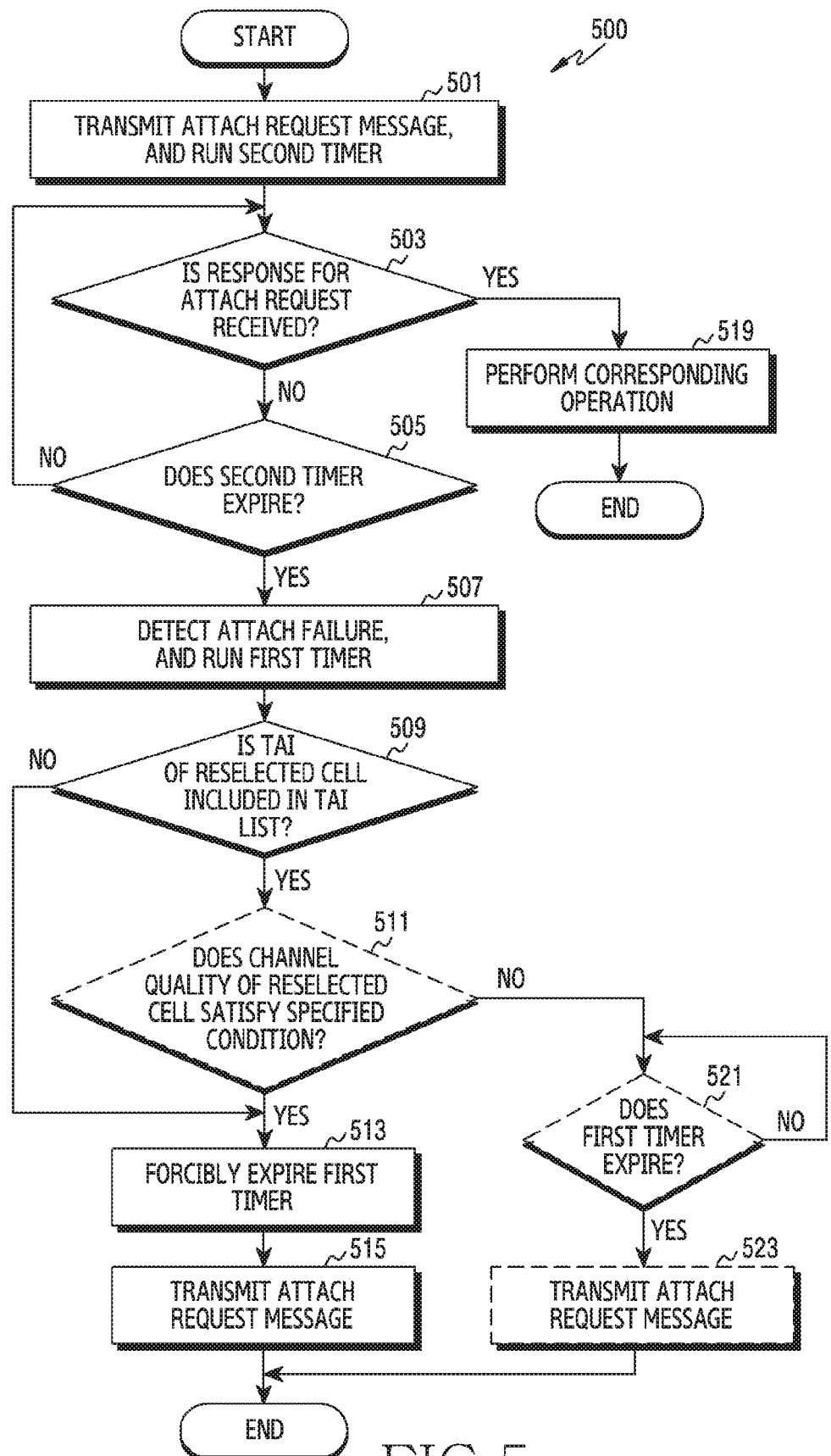
FIG. 5 is a detailed flowchart of a network attach procedure performed in an electronic device, based on a tracking area of a reselected cell, according to an embodiment of the disclosure.

FIG. 5 is a detailed flowchart of a network attach procedure performed in an electronic device, based on a tracking area of a reselected cell, according to an embodiment of the disclosure. The electronic device performing the operation of FIG. 5 may be the electronic device 101 of FIG. 1. Herein, an operation indicated by a dotted line may be omitted according to an embodiment. Operations of FIG. 5 described hereinafter may be detailed operations of FIG. 2. Hereinafter, among the operations in FIG. 5, descriptions on an operation performed in the same manner as described in FIG. 2 may be omitted.

Referring to FIG. 5, according to various embodiments, in a method 500, at operation 501, the electronic device (e.g., the processor 120 of FIG. 1) may transmit an attach request message (or signal), and may run a second timer. According to an embodiment, if a TAU procedure has failed at least a specified number of times (e.g., about 10 times), the processor 120 may determine that a network attach is implicitly detached, and may transmit an attach request message. For example, if a reject message for the TAU request is received at least 10 times, the processor 120 may transmit the attach request message for a network re-attach. The processor 120 may run the second timer after transmitting the attach request message. The second timer may be, for example, a T3410 timer, and may measure a time duration corresponding to about 15 seconds from a timing at which the attach request message is transmitted. According to an embodiment, if the network attach is implicitly detached because the TAU procedure has failed at least a specified number of times, the processor 120 may not delete a TAI list acquired during a previous attach procedure from a memory (e.g., the memory 130 of FIG. 1) but may maintain the TAI list.

According to various embodiments, in operation 503, the electronic device (e.g., the processor 120) may determine whether a response for the attach request is received. For example, the processor 120 may determine whether an attach accept message or an attach reject message is received during the second timer runs.

According to various embodiments, if the response for the attach request is not received, in operation 505, the electronic device (e.g., the processor 120) may determine whether the second timer expires. For example, the processor 120 may determine whether the second timer expires in a state where a response for an attach request is not received. According to various embodiments, if the second timer does not expire, returning to operation 503, the electronic device (e.g., the processor 120) may determine whether the response for the attach request is received.

According to various embodiments, if the response for the attach request is received, in operation 519, the electronic device (e.g., the processor 120) may perform a corresponding operation.

According to various embodiments, if the second timer expires, in operation 507, the electronic device (e.g., the processor 120) may detect that the attach has failed, and may run the first timer. The operation 507 of running the first timer may be identical to the operation 203 of FIG. 2.

According to various embodiments, the operations 509 to 515 and operations 521 to 523 of FIG. 5 may be identical at least in part to the operations 207 to 213 and operation 221 to 223 of FIG. 2.

Figure 6:
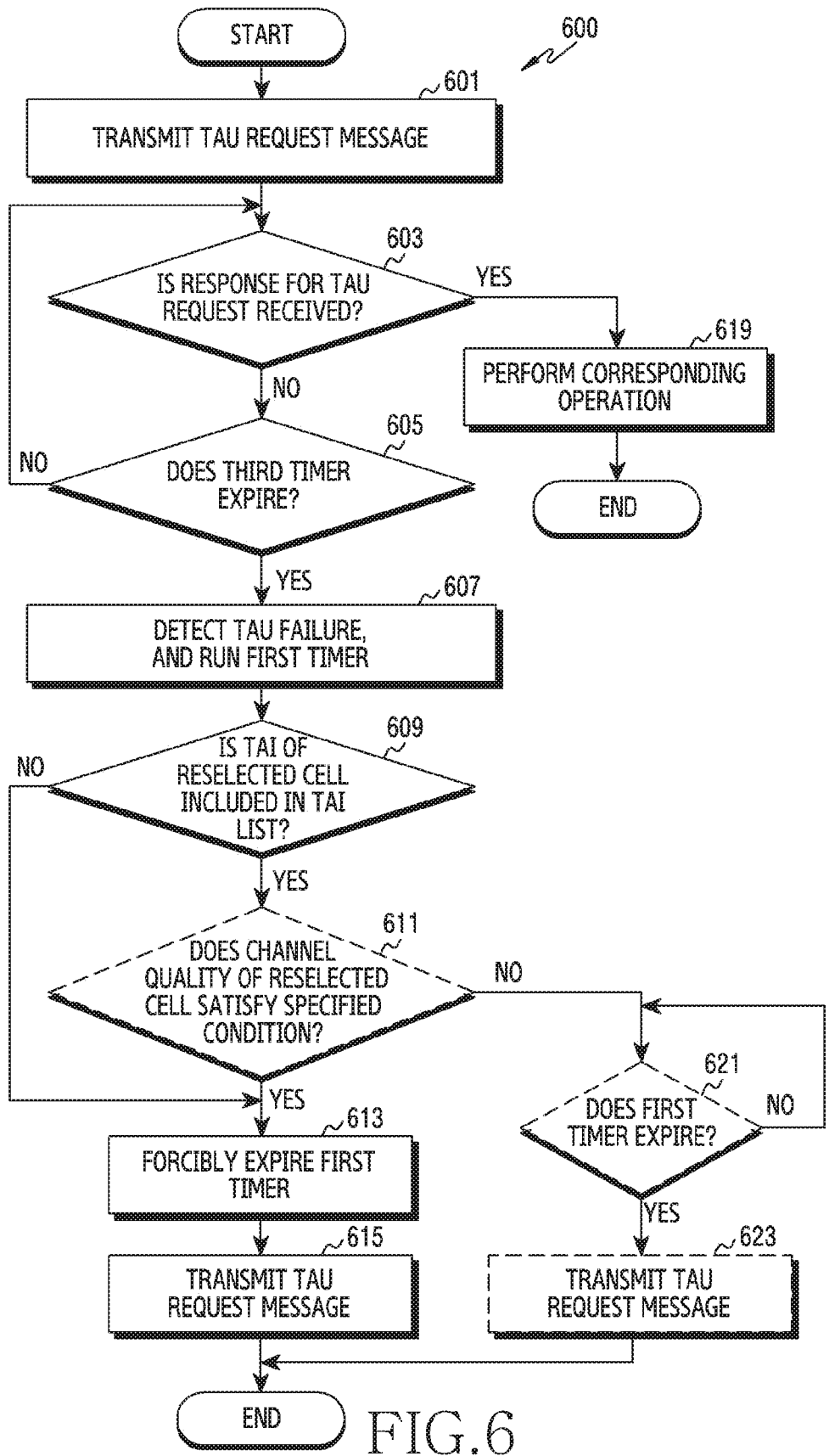
FIG. 6 is a detailed flowchart of a Tracking Area Update (TAU) procedure performed in an electronic device, based on a tracking area of a reselected cell, according to an embodiment of the disclosure.

FIG. 6 is a detailed flowchart of a TAU procedure performed in an electronic device, based on a tracking area of a reselected cell, according to an embodiment of the disclosure. The electronic device performing the operation of FIG. 6 may be the electronic device 101 of FIG. 1. Herein, an operation indicated by a dotted line may be omitted according to an embodiment. Operations of FIG. 6 described hereinafter may be detailed operations of some embodiments described with reference to FIG. 2. Hereinafter, among the operations in FIG. 6, descriptions on an operation performed in the same manner as described in FIG. 2 may be omitted.

Referring to FIG. 6, according to various embodiments, in a method 600, at operation 601, the electronic device (e.g., the processor 120 of FIG. 1) may transmit a TAU request message (or signal) and may run a third timer. According to an embodiment, when there is a change in a tracking area, the processor 120 may transmit the TAU request message including information on the changed tracking area. For example, after cell reselection is performed, if a TAI of the reselected cell is not included in a pre-acquired TAI list, the processor 120 may transmit the TAU request message. For another example, after a Circuit Switched Fall Back (CSFB) call is finished in a first cell, the electronic device 101 may return to the first cell of the existing LTE to transmit the TAU request message. After the TAU request message is transmitted, the processor 120 may run the third timer. The third timer may be, for example, a T3430 timer, and may measure a time duration corresponding to about 15 seconds from a timing at which the TAU request message is transmitted.

According to various embodiments, in operation 603, the electronic device (e.g., the processor 120) may determine whether a response for the TAU request is received. For example, the processor 120 may determine whether a TAU accept message or a TAU reject message is received during the third timer runs.

According to various embodiments, if the response for the TAU request is not received, in operation 605, the electronic device (e.g., the processor 120) may determine whether the third timer expires. For example, the processor 120 may determine whether the third timer expires in a state where the response for the TAU request is not received. According to various embodiments, if the third timer does not expire, returning to operation 603, the electronic device (e.g., the processor 120) may determine whether the response for the TAU request is received.

According to various embodiments, if the response for the TAU request is received, in operation 619, the electronic device (e.g., the processor 120) may perform a corresponding operation.

According to various embodiments, if the third timer expires, in operation 607, the electronic device (e.g., the processor 120) may detect that the TAU has failed, and may run the first timer. The operation 607 of running the first timer may be identical to the operation 203 of FIG. 2.

According to various embodiments, the operations 609 to 615 and operations 621 to 623 of FIG. 6 may be identical at least in part to the operations 207 to 213 and operation 221 to 223 of FIG. 2.

According to various embodiments of the disclosure, as described above, the electronic device 101 may perform cell reselection in a state where a specified first timer (e.g., a T3411 timer) runs due to an attach failure or a TAU failure, may expire a specified first timer on the basis of the TAI of the reselected cell and a pre-acquired TAI list, and may attempt the attach or the TAU, thereby minimizing a time in which a network-based communication service is not provided. For example, a duration in which a mute and/or image breakage occurs during the call can be minimized, and a call drop phenomenon can be prevented from occurring during the call. In addition, a call transmission rate and/or reception rate can be improved, a message transmission rate and/or reception rate can be improved, data streaming service interruption can be minimized, and a recovery rate of a data unavailable state can be accelerated.

A method of operating an electronic device (e.g., the electronic device 101 shown in FIG. 1), in accordance with an embodiment may include: running a specified first timer upon detecting an attach failure or a TAU failure in a first cell; performing cell reselection on a second cell during the first timer runs; determining whether a TAI of the second cell is found in the TAI list; and if the TAI of the second cell is found in the TAI list, forcibly expiring the first timer, and transmitting an attach request message or a TAU message through a communication module.

According to an embodiment, the transmitting of the attach request signal or the TAU message comprises: determining whether channel quality of the second cell satisfies a specified condition; and if the channel quality of the second cell satisfies the specified condition, expiring the first timer, and transmitting the attach request message or the TAU message through the communication module.

According to an embodiment, the method may further include: if the channel quality of the second cell does not satisfy the specified condition, waiting until the first timer expires; and if the first timer expires, transmitting the attach request message or the TAU message through the communication module.

According to an embodiment, the method may further include: if the TAI of the second cell is found in the TAI list, stopping the first timer; and transmitting a service request message while omitting transmission of the attach request message or the TAU message.

According to an embodiment, the performing of the cell reselection comprises barring the use of the first cell, and performing cell reselection on the second cell, during the first timer runs.

According to an embodiment, the running of the first timer upon detecting the attach failure or the TAU failure in the first cell comprises: transmitting an attach request message in the first cell; detecting whether the attach failure occurs due to a low layer failure after the attach request message is transmitted; and running the first timer upon detecting the attach failure due to the low layer failure.

According to an embodiment, the running of the first timer upon detecting the attach failure or the TAU failure in the first cell comprises: transmitting an attach request message in the first cell; determining whether a response for the attach request message is received during a specified time duration from a timing at which the attach request message is transmitted; and if the response for the attach request message is not received during the specific time duration, detecting the attach failure, and running the first timer.

According to an embodiment, the running of the first timer upon detecting the attach failure or the TAU failure in the first cell comprises: transmitting a TAU request message in the first cell; determining whether the TAU failure caused by the low layer failure is detected after the TAU request message is transmitted; and running the first timer upon detecting the TAU failure.

According to an embodiment, the running of the first timer upon detecting the attach failure or the TAU failure in the first cell comprises: transmitting a TAU request message in the first cell; determining whether the response for the TAU request message is received during a specified time duration from a timing at which the TAU request message is transmitted; and if the response for the TAU request message is not received during the specific time duration, detecting the TAU failure, and running the first timer.

According to an embodiment, the TAI list is acquired through at least one of a previously received attach accept message and a TAU accept message.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a communication circuitry;
    at least one processor; and
    a memory operatively coupled with the at least one processor to store a tracking area identifier (TAI) list,
    wherein the memory comprises instructions which, when executed, cause the at least one processor to:
        run a specified first timer upon detecting an attach failure or a tracking area update (TAU) failure in a first cell,
        perform cell reselection on a second cell while the first timer runs,
        determine whether a TAI of the second cell is found in the TAI list, and
        when the TAI of the second cell is found in the TAI list:
            forcibly expire the first timer, and
            transmit an attach request message or a TAU message through the communication circuitry.

2. The electronic device of claim 1, wherein the instructions further cause the at least one processor to:
    when the TAI of the second cell is found in the TAI list, determine whether channel quality of the second cell satisfies a specified condition, and
    when the channel quality of the second cell satisfies the specified condition:
        expire the first timer, and
        transmit the attach request message or the TAU message through the communication circuitry.

3. The electronic device of claim 2, wherein the instructions further cause the at least one processor to:
    when the channel quality of the second cell does not satisfy the specified condition, wait until the first timer expires, and
    when the first timer expires, transmit the attach request message or the TAU message through the communication circuitry.

4. The electronic device of claim 1, wherein the instructions further cause the at least one processor to, when the TAI of the second cell is found in the TAI list:
    stop the first timer, and
    transmit a service request message through the communication circuitry.

5. The electronic device of claim 1, wherein the instructions further cause the at least one processor to:
    bar the use of the first cell, and
    control the communication circuitry to perform cell reselection on the second cell, during the first timer runs.

6. The electronic device of claim 1, wherein the instructions further cause the at least one processor to:
    transmit the attach request message in the first cell,
    detect whether the attach failure occurs due to a low layer failure after the attach request message is transmitted, and
    run the first timer upon detecting the attach failure due to the low layer failure.

7. The electronic device of claim 1, wherein the instructions further cause the at least one processor to:
transmit the attach request message in the first cell,
determine whether a response for the attach request message is received during a specified time duration from a timing at which the attach request message is transmitted, and
when the response for the attach request message is not received during the specific time duration, detect the attach failure, and run the first timer.

8. The electronic device of claim 1, wherein the instructions further cause the at least one processor to:
transmit a TAU request message in the first cell,
determine whether the TAU failure caused by the low layer failure is detected after the TAU request message is transmitted, and
run the first timer upon detecting the TAU failure.

9. The electronic device of claim 1, wherein the instructions further cause the at least one processor to:
transmit a TAU request message in the first cell,
determine whether the response for the TAU request message is received during a specified time duration from a timing at which the TAU request message is transmitted, and
when the response for the TAU request message is not received during the specific time duration, detect the TAU failure, and run the first timer.

10. The electronic device of claim 1, wherein the TAI list is acquired through at least one of a previously received attach accept message or a TAU accept message.

11. A method of operating an electronic device, the method comprising:
running a specified first timer upon detecting an attach failure or a tracking area update (TAU) failure in a first cell;
performing cell reselection on a second cell during the first timer runs;
determining whether a tracking area identifier (TAI) of the second cell is found in a TAI list; and
when the TAI of the second cell is found in the TAI list, forcibly expiring the first timer, and transmitting an attach request message or a TAU message through a communication circuitry.

12. The method of claim 11, wherein the transmitting of the attach request signal or the TAU message comprises:
determining whether channel quality of the second cell satisfies a specified condition; and
when the channel quality of the second cell satisfies the specified condition, expiring the first timer, and transmitting the attach request message or the TAU message through the communication circuitry.

13. The method of claim 12, further comprising:
when the channel quality of the second cell does not satisfy the specified condition, waiting until the first timer expires; and
when the first timer expires, transmitting the attach request message or the TAU message through the communication circuitry.

14. The method of claim 11, further comprising:
when the TAI of the second cell is found in the TAI list, stopping the first timer; and
transmitting a service request message while omitting transmission of the attach request message or the TAU message.

15. The method of claim 11, wherein the performing of the cell reselection comprises barring the use of the first cell, and performing cell reselection on the second cell, during the first timer runs.

16. The method of claim 11, wherein the running of the first timer upon detecting the attach failure or the TAU failure in the first cell comprises:
transmitting the attach request message in the first cell;
detecting whether the attach failure occurs due to a low layer failure after the attach request message is transmitted; and
running the first timer upon detecting the attach failure due to the low layer failure.

17. The method of claim 11, wherein the running of the first timer upon detecting the attach failure or the TAU failure in the first cell comprises:
transmitting the attach request message in the first cell;
determining whether a response for the attach request message is received during a specified time duration from a timing at which the attach request message is transmitted; and
when the response for the attach request message is not received during the specific time duration, detecting the attach failure, and running the first timer.

18. The method of claim 11, wherein the running of the first timer upon detecting the attach failure or the TAU failure in the first cell comprises:
transmitting a TAU request message in the first cell;
determining whether the TAU failure caused by the low layer failure is detected after the TAU request message is transmitted; and
running the first timer upon detecting the TAU failure.

19. The method of claim 11, wherein the running of the first timer upon detecting the attach failure or the TAU failure in the first cell comprises:
transmitting a TAU request message in the first cell;
determining whether the response for the TAU request message is received during a specified time duration from a timing at which the TAU request message is transmitted; and
when the response for the TAU request message is not received during the specific time duration, detecting the TAU failure, and running the first timer.

20. The method of claim 11, wherein the TAI list is acquired through at least one of a previously received attach accept message or a TAU accept message.

* * * * *